United States Patent
Goto et al.

(10) Patent No.: US 10,985,386 B2
(45) Date of Patent: Apr. 20, 2021

(54) FUEL CELL INCLUDING GLASS SEAL WITH BARIUM FREE SURFACE REGIONS

(71) Applicant: Panasonic Intellectual Property Management Co., Ltd., Osaka (JP)

(72) Inventors: Takehito Goto, Osaka (JP); Shigenori Onuma, Kyoto (JP); Tomohiro Kuroha, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 103 days.

(21) Appl. No.: 16/296,163

(22) Filed: Mar. 7, 2019

(65) Prior Publication Data

US 2019/0305331 A1 Oct. 3, 2019

(30) Foreign Application Priority Data

Apr. 3, 2018 (JP) .............................. JP2018-071612

(51) Int. Cl.
*H01M 8/0282* (2016.01)
*H01M 8/1253* (2016.01)
*H01M 8/124* (2016.01)

(52) U.S. Cl.
CPC ....... *H01M 8/0282* (2013.01); *H01M 8/1253* (2013.01); *H01M 2008/1293* (2013.01); *H01M 2300/0077* (2013.01)

(58) Field of Classification Search
CPC .......................... H01M 8/0282; H01M 8/1253
USPC ........................................................ 429/460
See application file for complete search history.

(56) References Cited

U.S. PATENT DOCUMENTS

| | | | |
|---|---|---|---|
| 2012/0316052 A1 | 12/2012 | Akamatsu et al. | |
| 2015/0318563 A1* | 11/2015 | Kuribayashi | H01M 8/1004 429/482 |
| 2016/0236967 A1 | 8/2016 | Maeda et al. | |
| 2016/0311720 A1 | 10/2016 | Suffner | |
| 2018/0294489 A1 | 10/2018 | Morikawa | |

FOREIGN PATENT DOCUMENTS

| | | | |
|---|---|---|---|
| JP | 2013235651 A | * | 11/2013 |
| JP | 2015022892 A | * | 2/2015 |
| JP | 2015153709 A | * | 8/2015 |
| WO | 2011/105519 | | 9/2011 |
| WO | 2015/046195 | | 4/2015 |
| WO | 2016/178394 | | 11/2016 |

OTHER PUBLICATIONS

Ahmed et al., Structural study and proton conductivity in Yb-doped $BaZrO_3$, 2007, Solid State Ionics, 178, 515-520 (Year: 2007).*
The Extended European Search Report dated Sep. 6, 2019 for the related European Patent Application No. 19162715.7.

* cited by examiner

*Primary Examiner* — Sean P Cullen
(74) *Attorney, Agent, or Firm* — McDermott Will and Emery LLP

(57) ABSTRACT

The fuel cell of the present disclosure includes: a unit cell including: a fuel electrode, an air electrode and electrolyte disposed between the fuel electrode and the air electrodes; a separator for separating a fuel gas flowing though the fuel electrode and air flowing through the air electrode; and a sealing constituted of a glass composition for bonding the separator and the electrolyte, and at least a surface region of the sealing portion exposed to the fuel gas and the air does not contain Ba.

4 Claims, 5 Drawing Sheets

FUEL CELL INCLUDING GLASS SEAL WITH BARIUM FREE SURFACE REGIONS

BACKGROUND

1. Technical Field

The present disclosure relates to a fuel cell including a fuel cell stack generating electric power from air and fuel.

2. Description of the Related Art

Fuel cells are compact and have high power generation efficiency and further can enhance the overall efficiency by utilizing the heat during power generation, and are therefore used as devices for distributed power generation systems. In particular, solid oxide fuel cells (hereinafter, referred to as SOFCs), which are operated at high temperatures, show high power generation efficiency accounting for the overall efficiency and are therefore being developed as devices for distributed power generation systems focused on power generation.

A single cell of a SOFC is composed of a fuel electrode, an air electrode, and an electrolyte, and a fuel gas and air (oxidant gas) are supplied to the fuel electrode and the air electrode, respectively. The single cell also includes a separator for separating the fuel gas and air to be supplied (for example, International Publication No. WO 2016/178394: PTL 1). In the fuel cell stack disclosed in PTL 1, the separator has a frame-like shape having a hole at the center and is disposed such that the rim portion faces the peripheral surface of the electrolyte on the air electrode side. A bonding portion (sealing portion) is provided between the facing portions, and the separator and the electrolyte are bonded to each other via this bonding portion. In such a configuration of the fuel cell stack disclosed in PTL 1, an air distribution region facing the air electrode and a fuel gas distribution region facing the fuel electrode are divided from each other to prevent leakage of gas from one electrode side to the other electrode side.

It is proposed to use a glass composition as a sealing material (sealing portion) between a single cell and a metal member in a SOFC (International Publication No. WO 2015/046195: PTL 2). The glass composition according to PTL 2 does not substantially contain boron oxide, alkali metal oxides, and aluminum oxide and has a composition ratio by mol %, $SiO_2$: 40% to 55%, BaO: 18% to 35%, $TiO_2 + ZrO_2$: 0.1% to 10%, ZnO: 0% to 15%, CaO: 0% to 20%, MgO: 0% to 9%, SrO: 0% to 5%, and $La_2O_3$: 0% to 2%. Such a composition ratio can provide a glass composition having a strength and a thermal expansion coefficient suitable for sealing, while not containing elements having a risk of contaminating the electrodes of the SOFC.

SUMMARY

However, when the operating temperature of the SOFC is within a low temperature range of 600° C. or less, the thermodynamically stable state of Ba contained in the sealing portion according to PTL 2 is the carbonate state. Accordingly, when a sealing portion containing Ba is used for sealing the fuel cell, $BaCO_3$ is generated in a region of the sealing portion coming into contact with a gas containing carbon. Here, since the portion in which $BaCO_3$ is generated becomes brittle and fragile, the sealing properties of the sealing portion decrease.

One non-limiting and exemplary embodiment provides a fuel cell including a sealing portion appropriately maintaining the sealing properties even when the operating temperature is in a low temperature range.

In one general aspect, the techniques disclosed here feature a fuel cell including: a unit cell including: a fuel electrode, an air electrode and electrolyte disposed between the fuel electrode and the air electrodes; a separator for separating a fuel gas flowing though the fuel electrode and air flowing through the air electrode; and a sealing constituted of a glass composition for bonding the separator and the electrolyte, and at least a surface region of the sealing portion exposed to the fuel gas and the air does not contain Ba.

The fuel cell according to an embodiment of the present disclosure is configured as described above and can include a sealing portion that can appropriately maintain the sealing properties even when the operating temperature is in a low temperature range.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
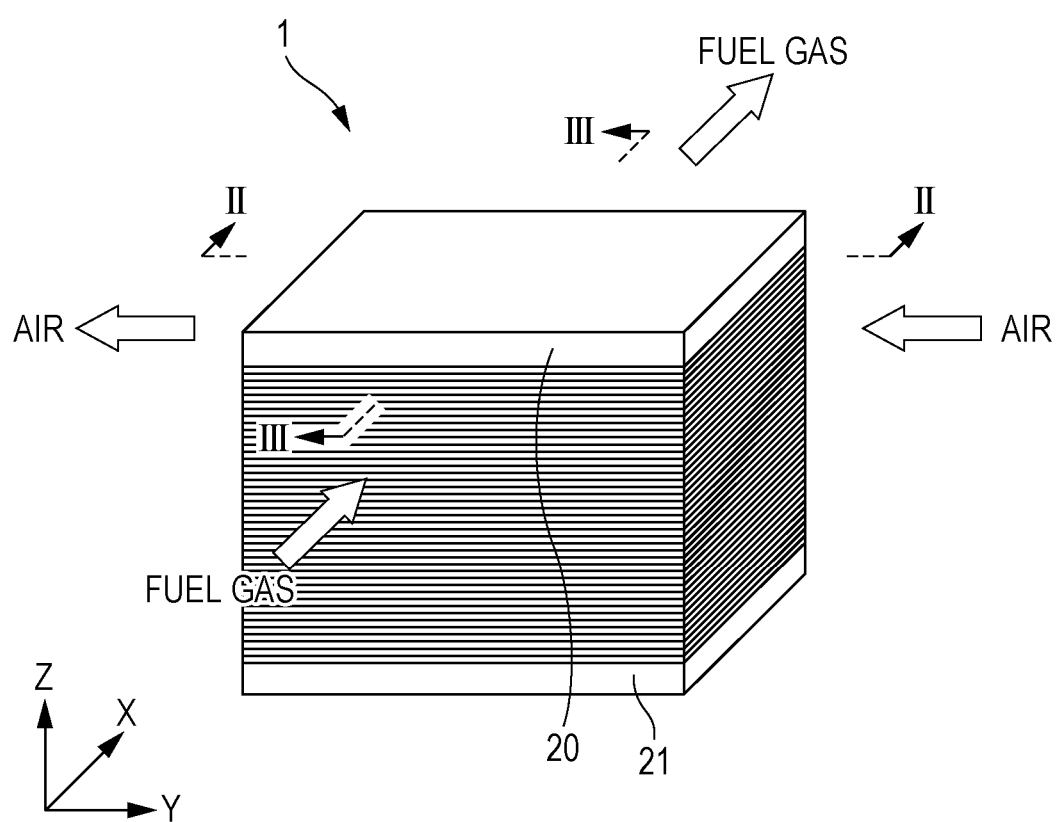
FIG. 1 is a perspective view illustrating an example of a schematic configuration of a fuel cell stack included in a fuel cell according to an embodiment of the present disclosure.

Underlying Knowledge Forming Basis of Aspect of the Present Disclosure

As the fuel cell stack disclosed in PTL 1, in a configuration in which an electrolyte and a separator are hermetically bonded to prevent leakage of gas from one electrode side to the other electrode side, the present inventors have earnestly studied on a sealing portion for hermetically bonding the electrolyte and the separator.

As such a sealing portion, use of a glass composition is first suggested. The glass composition melts at a temperature higher than the operating temperature of the SOFC by about 100° C. to 150° C. to hermetically bond a ceramic electrolyte and a separator member of a metal such as stainless steel.

Incidentally, when a glass composition is used as a sealing portion, it is necessary to consider not only the differences of the thermal expansion coefficients between the glass composition and the electrolyte and between the glass composition and the separator but also the reactivity. The reactivity of the sealing portion with each of the electrolyte and the separator or the reactivity of the sealing portion with the gas in the atmosphere are inevitably changed by the operating temperature of the SOFC. That is, the present inventors have found that the stable composition of elements constituting the sealing portion in a temperature range under low-temperature operation of the SOFC (hereinafter, referred to as low temperature range) is different from the composition in a temperature range under usual power-generating operation, and also have found that some elements affect the sealing properties in a temperature range under low-temperature operation of the SOFC if such elements are contained in the glass composition.

For example, when the glass composition disclosed in PTL 2 is used as a sealing portion for bonding between different materials, i.e., between a ceramic electrolyte and a metal separator of a SOFC, the glass composition can be adjusted so as to have a thermal expansion coefficient suitable for bonding between different materials. However, it was found that since Ba contained in the glass composition disclosed in PTL 2 reacts with carbon dioxide in a low temperature range and voluntarily changes into $BaCO_3$, the composition has a problem in the sealing properties between different materials.

The findings by the present inventors described above have not been elucidated, discover new problems, and have novel technical features exhibiting remarkable effects. The present disclosure specifically provides the following aspects.

A fuel cell according to a first aspect of the present disclosure includes: a unit cell including: a fuel electrode, an air electrode and electrolyte disposed between the fuel electrode and the air electrodes; a separator for separating a fuel gas flowing though the fuel electrode and air flowing through the air electrode; and a sealing constituted of a glass composition for bonding the separator and the electrolyte, and at least a surface region of the sealing portion exposed to the fuel gas and the air does not contain Ba.

Here, the first region is a region through which air and fuel gas molecules can penetrate from the interfaces respectively coming into contact with the air and the fuel gas toward the inside of the sealing portion, and is affected by carbon dioxide contained in the air and the fuel gas.

According to the configuration above, the sealing portion constituted of a glass composition substantially does not contain Ba at least in the first region. Accordingly, even if the operating temperature of the fuel cell is within a low temperature range (for example, 600° C. or less), since $BaCO_3$ is not generated in the sealing portion, the sealing properties of the sealing portion can be prevented from decreasing.

Accordingly, the fuel cell according to the first aspect of the present disclosure has an advantage of providing a sealing portion appropriately maintaining the sealing properties even when the operating temperature is within a low temperature range.

In a fuel cell according to a second aspect of the present disclosure, the sealing portion in the first aspect may contain Ba in a second region that is a remaining region excluding the first region.

Here, the second region is a region excluding the first region that is a predetermined region from the interfaces respectively coming into contact with the fuel gas and the air toward the inside of the sealing portion. That is, the second region is a region that does not contact with the fuel gas and the air in the sealing portion.

According to the configuration above, since the second region of the sealing portion contains Ba, BaO can be generated in the glass composition constituting the sealing portion. Accordingly, the softening point of the glass composition can be decreased, and the expansion coefficient can be increased.

Accordingly, in the fuel cell according to the second aspect, a sealing portion having a thermal expansion coefficient suitable for sealing between the separator and the electrolyte can be readily formed at low temperature.

In a fuel cell according to a third aspect of the present disclosure, the electrolyte in the first or second aspect may include a proton conductor.

In a fuel cell according to a fourth aspect of the present disclosure, the proton conductor in the third aspect may be represented by a compositional formula: $BaZr_{1-x}M_xO_3$, where $0.05 \leq x \leq 0.5$; M is at least one selected from the group consisting of Sc, In, Lu, Yb, Tm, Er, Y, Ho, Dy, and/or Gd.

In a fuel cell according to a fifth aspect of the present disclosure, the proton conductor in the fourth aspect may be represented by a compositional formula: $BaZr_{1-x}M_xO_3$, wherein M is Yb.

Embodiments of the present disclosure will now be described with reference to the drawings. The following embodiments are merely examples of each of the above-described aspects. Accordingly, for example, the shapes, materials, components, arrangement positions and connection modes of the components shown below do not limit each of the aspects.

In the following description, the same or corresponding component members are denoted by the same reference signs throughout all the drawings, and the description thereof may be omitted. The drawings schematically illustrate the respective components, and the shapes, dimensional ratios, and so on are not precise in some cases.

Embodiment

Configuration of Fuel Cell Stack

Figure 2:
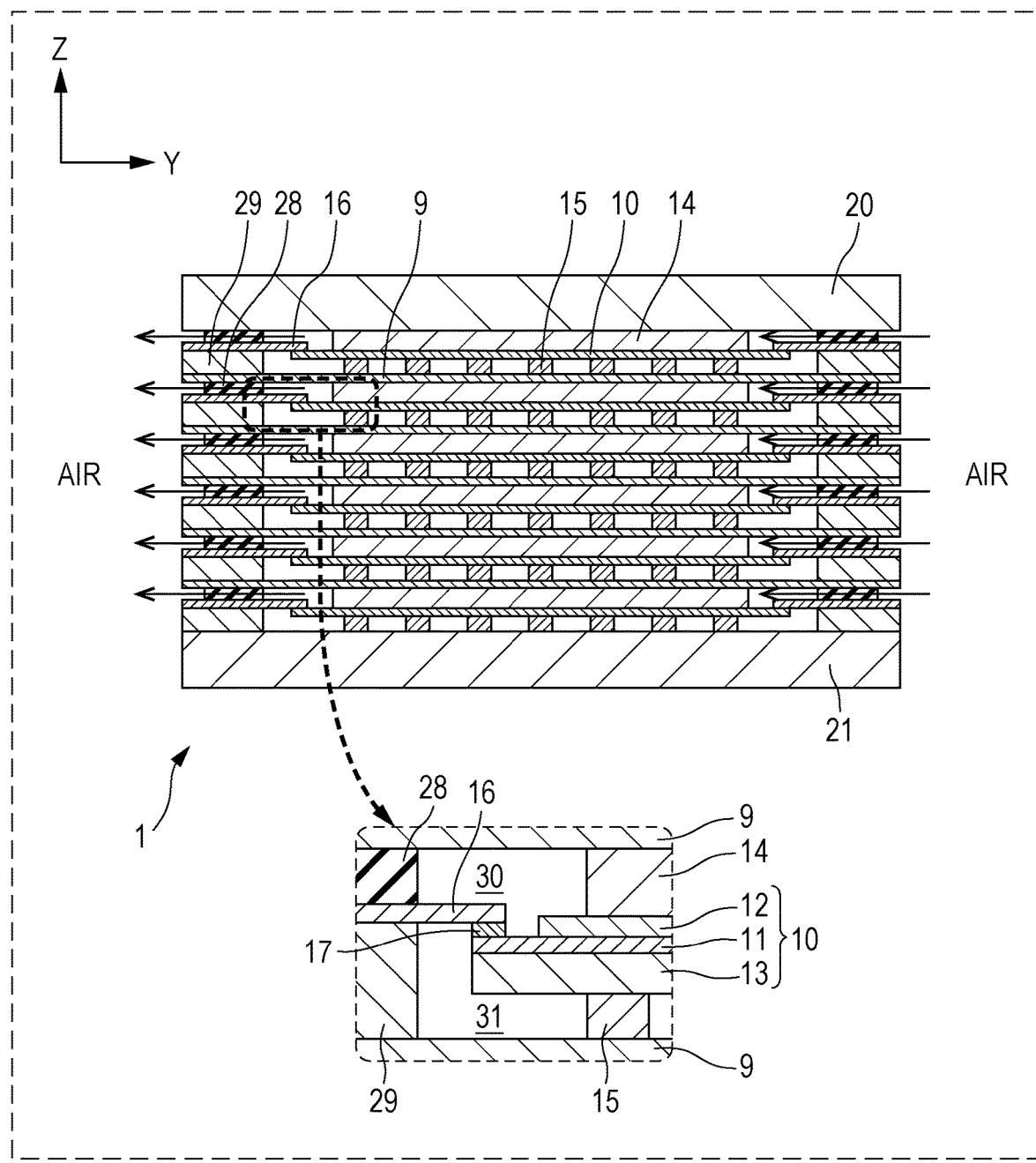
FIG. 2 is a cross-sectional view of the fuel cell stack taken along the line II-II in FIG. 1.
Figure 3:
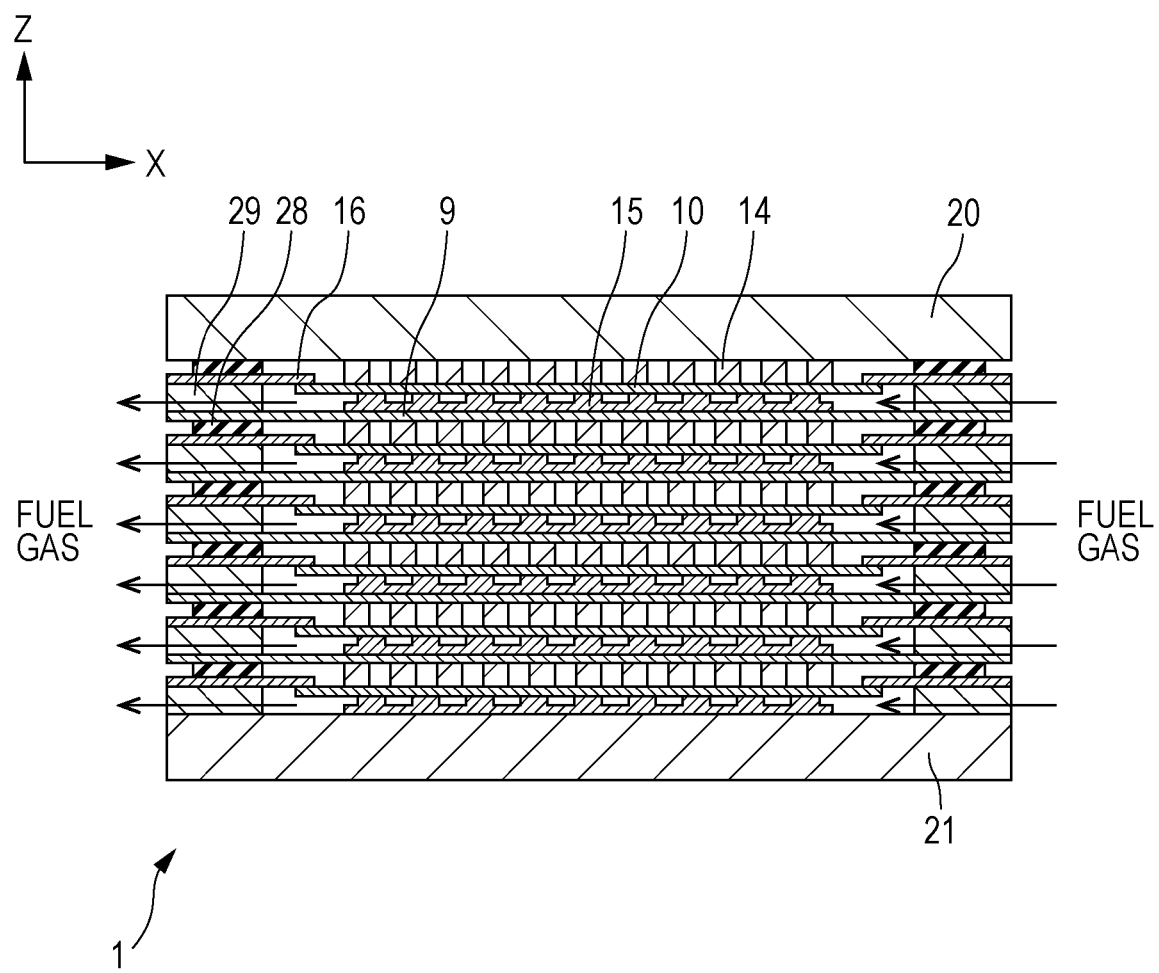
FIG. 3 is a cross-sectional view of the fuel cell stack taken along the line III-Ill in FIG. 1.

The configuration of a fuel cell stack 1 included in a fuel cell according to an embodiment will be described with reference to FIGS. 1 to 3. FIG. 1 is a perspective view illustrating an example of a schematic configuration of a fuel cell stack 1 included in a fuel cell according to the embodiment of the present disclosure. FIG. 2 is a cross-sectional view of the fuel cell stack 1 taken along the line II-II in FIG. 1. FIG. 3 is a cross-sectional view of the fuel cell stack 1 taken along the line III-III in FIG. 1.

Each drawing show mutually orthogonal XYZ axes for specifying directions. In the present specification, for convenience, the positive direction of the Z axis may be referred to as an upward direction, and the negative direction may be referred to as a downward direction. In the fuel cell stack 1 shown in FIGS. 1 and 2, single cells 10 are stacked in the Z-axis direction, but the stacking direction of the single cells 10 is not necessarily limited to the Z-axis direction. In addition, in the present specification, the fuel cell is described using a solid oxide fuel cell (SOFC) as an example, but is not limited thereto.

As shown in FIGS. 1 to 3, the fuel cell stack 1 is configured such that a first end plate 20 is disposed on an upper base, a second end plate 21 is disposed on a lower base, and a layer including a plurality of single cells 10 stacked vertically (in the Z-axis direction) is sandwiched between the first end plate 20 and the second end plate 21.

The first end plate 20 and the second end plate 21 are rectangular plate-shaped conductive members and can be formed from, for example, stainless steel or stainless steel with a surface coated with a conductive ceramic member (e.g., $(Mn,Co)_3O_4$). A layer including a plurality of single cells 10 is sandwiched by the first end plate 20 and the second end plate 21. The first end plate 20 functions as an output terminal on the plus side of the fuel cell stack 1, and the second end plate 21 functions as an output terminal on the minus side of the fuel cell stack 1.

Although it is not shown in FIGS. 1 to 3, an air inlet (not shown) for supplying air may be provided in one side (first side) of the periphery of the first end plate 20 or the second end plate 21, and an air outlet (not shown) for discharging air may be provided in another side (second side) facing the above-mentioned side (first side). In addition, a fuel gas inlet (not shown) for supplying a fuel gas may be provided in a side (third side) orthogonal to the first side in which the air inlet is provided, and a fuel gas outlet (not shown) for discharging the fuel gas may be provided in another side (fourth side) facing the above-mentioned side (third side).

Examples of the fuel gas are those of 300° C. to 700° C. and include hydrogen and reformed gases obtained by reforming hydrocarbon fuel gases such as town gas or LPG.

As shown in FIG. 2, the air supplied through the air inlet (not shown) passes through the circumference of the single cell 10 on the air electrode 12 side (the side on which the air electrode-side current collector 14 is provided) and is discharged through the air outlet (not shown).

As shown in FIG. 3, the fuel gas supplied through the fuel gas inlet (not shown) passes through the circumference of the single cell 10 on the fuel electrode 13 side (the side on which the fuel electrode-side current collector 15 is provided) and is discharged through the fuel gas outlet (not shown).

As described above, in the fuel cell stack 1 according to the embodiment of the present disclosure, the air and the fuel gas flow such that their flow directions substantially cross each other in the X-Y plane.

Configuration of Single Cell

The configuration of the single cell 10 included in the fuel cell stock of the fuel cell will now be described with reference to FIG. 2.

As shown in FIG. 2, the fuel single cell 10 includes an electrolyte 11, and an air electrode 12 and a fuel electrode 13 arranged so as to face each other in the vertical direction (the stacking direction of the single cell 10) with the electrolyte 11 therebetween. As shown in FIG. 2, the fuel single cell 10 according to the embodiment of the present disclosure is a fuel electrode-supporting single cell in which the fuel electrode 13 supports the electrolyte 11 and the air electrode 12, but is not limited thereto and may be an air electrode-supporting single cell in which the air electrode 12 supports the electrolyte 11 and the fuel electrode 13. Alternatively, the single cell 10 may be an electrolyte-supporting single cell in which the electrolyte 11 supports the fuel electrode 13 and the air electrode 12.

As shown in FIG. 2, the single cell 10 is provided with a separator 16 for separating the air to be supplied to the air electrode 12 and the fuel gas to be supplied to the fuel electrode 13.

The electrolyte 11 is a rectangular plate-shaped dense product and may be constituted of an yttria-stabilized zirconia (YSZ), lanthanum-gallate (La is partially substituted with Sr, and Ga is partially substituted with Mg), or ceria (Ce is partially substituted with Gd) oxide ion conductor or may be constituted of a proton conductor. The electrolyte 11 desirably has a high ion conductivity (for example, an ion conductivity higher than 0.001 S/cm, preferably 0.01 S/cm or more) and a low electron conductivity (for example, an electron conductivity lower than the ion conductivity of the electrolyte by one or more orders of magnitude, preferably two or more orders of magnitude).

The proton conductor may be represented by, for example, a compositional formula: $BaZr_{1-x}M_xO_3$ ($0.05 \leq x \leq 0.5$; M=Sc, In, Lu, Yb, Tm, Er, Y, Ho, Dy, and/or Gd). Desirably, the proton conductor may be Yb-doped barium zirconate (BZYb). The thickness of the electrolyte 11 is in a range of 1 μm or more and 50 μm or less. A smaller thickness of the electrolyte 11 is preferred from the viewpoint of power generation performance, but a larger thickness is preferred from the viewpoint of strength. Accordingly, the thickness of the electrolyte 11 is more preferably within an intermediate range between the both, 5 μm or more and 30 μm or less.

The fuel electrode 13 is preferably of a mixed conductor of electron and proton and is preferably constituted of a material having a composition stable for reducing gases such as hydrogen or reformed gas. For example, the fuel electrode 13 can be constituted of a mixture of nickel (Ni) and $BaZr_{1-x}M_xO_3$ ($0.05 \leq x \leq 0.5$; M=Sc, In, Lu, Yb, Tm, Er, Y, Ho, Dy, and/or Gd). In such a case, the weight ratio between nickel (Ni) and $BaZr_{1-x}M_xO_3$ can be, for example, 60:40. The fuel electrode 13 is not limited to this composition. The fuel electrode 13 as a support preferably has a thickness of 100 μm or more and 2 mm or less.

The air electrode 12 is preferably of a mixed conductor of electron and proton, and examples thereof include LSC: $La_{1-x}Sr_xCoO_3$ ($0.05 \leq x \leq 0.5$), and LSCF: $La_{1-x}Sr_xCo_{1-y}Fe_yFeO_3$ ($0.05 \leq x \leq 0.5$, $0.05 \leq y \leq 0.95$). The thickness of the air electrode 12 is 1 μm or more from the viewpoint of mixed conductivity of ion and electron and diffusivity of oxygen and is preferably 100 μm or less.

The separator 16 is a frame-shaped member having a rectangular hole at the center and is constituted of a metal composition forming an $Al_2O_3$ film as the surface layer. Examples of the metal composition include ferrite stainless steel containing Al. As shown in FIG. 2, the inner peripheral portion (rim portion of the hole) of the frame-shaped separator 16 is disposed so as to face the periphery surface of the electrolyte 11 on the side where the air electrode 12 is disposed. The separator 16 is connected to the facing periphery of the electrolyte 11 via the sealing portion 17. In the fuel cell stack 1, by the separator 16, an air distribution region 30 that faces the air electrode 12 and through which air flows and a fuel gas distribution region 31 that faces the fuel electrode 13 and through which a fuel gas flows are divided. Thus, the fuel cell stack 1 includes the separator 16 and thereby can prevent gas leakage from one electrode side to the other electrode side. The details of the separator 16 will be described in detail later.

An air electrode-side current collector 14 is provided on the outer side of the air electrode 12 of the single cell 10, and a fuel electrode-side current collector 15 is provided on the outer side of the fuel electrode 13. The single cell 10, the air electrode-side current collector 14, and the fuel electrode-side current collector 15 are sandwiched vertically between a pair of interconnectors 9.

The interconnector 9 is a rectangular plate-shaped conductive member and can be made of, for example, ferrite stainless steel. The interconnector 9 secures electrical continuity between stacked single cells 10, and prevents reactant gases from being mixed between the single cells 10. As shown in FIG. 2, a single interconnector 9 is disposed between adjacent single cells 10, and adjacent single cells 10 share a single interconnector 9.

An air electrode-side frame 28 is a frame-shaped member having a rectangular hole at the center and is made of, for example, an insulator such as mica, thermiculite, or vermiculte. The hole formed at the center of the air electrode-side frame 28 can form the air distribution region 30 facing the air electrode 12. The air electrode-side frame 28 is in contact with the separator 16 and the interconnector 9 in a state that compressive force is applied in the vertical direction (the z-axis direction) to seal the air distribution region 30 such that the flowing air does not leak to the outside of the fuel cell stack 1.

A fuel electrode-side frame 29 is a frame-shaped member having a rectangular hole at the center and is made of a metal. The hole formed at the center of the fuel electrode-side frame 29 can form the fuel gas distribution region 31 facing the fuel electrode 13. The fuel electrode-side frame 29 is in contact with the separator 16 and the interconnector 9 in a state that compressive force is applied in the vertical direction (the z-axis direction) to seal the fuel gas distribution region 31 such that the flowing fuel gas does not leak to the outside of the fuel cell stack 1.

Configuration of Separator

Figure 4:
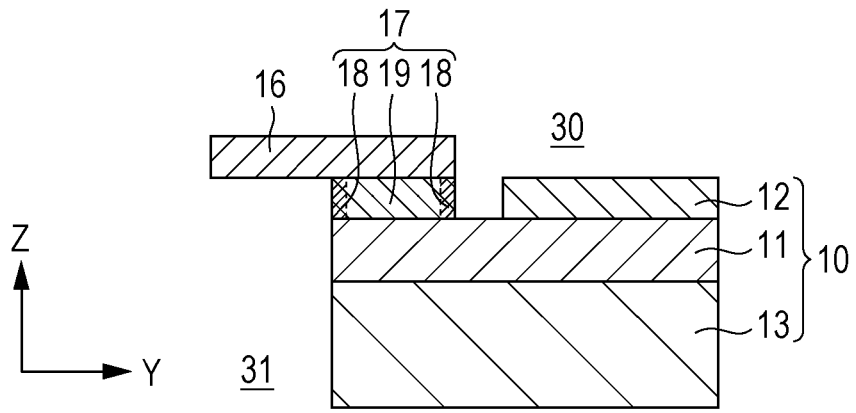
FIG. 4 is a diagram schematically illustrating an example of the configuration of the single cell, separator, and sealing portion shown in FIG. 2.

The configuration of the separator will be described in detail with reference to FIGS. 2 and 4. FIG. 4 is a diagram schematically illustrating an example of the configuration of the single cell 10, the separator 16, and the sealing portion 17 shown in FIG. 2.

As shown in FIGS. 2 and 4, the separator 16 has a function of dividing air (air distribution region 30) and a fuel gas (fuel gas distribution region 31). Furthermore, the separator 16 is connected to the electrolyte 11 of the single cell 10 via the sealing portion 17 and has a function of absorbing the influence of expansion and contraction of the single cell 10 occurring, for example, at the time of starting or stopping the fuel cell. The separator 16, as described above, is made of a metal composition forming an $Al_2O_3$ film as the surface layer. The thickness of the $Al_2O_3$ film formed as the surface layer is 0.1 µm or more, preferably within a range of 1 µm to 100 µm. The metal composition forming the separator 16 is, for example, stainless steel and preferably Al-containing ferrite stainless steel having a linear expansion coefficient similar to that of the single cell 10 (e.g., 8 to 13 ppm/K). Examples of the metal composition forming the separator 16 include NCA-1 manufactured by Nisshin Steel Co., Ltd. and NSSC (registered trademark) 21MK manufactured by Nippon Steel & Sumitomo Metal Corporation. Such ferrite stainless steel contains, for example, Si, Mn, and Ti, in addition to Fe, Cr, and Al, and incorporates oxygen to form an $Al_2O_3$ film or a $Cr_2O_3$ film as the surface layer. The separator 16 formed from such ferrite stainless steel may be heated to 500° C. or more in advance before the bonding with the sealing portion 17 for forming an $Al_2O_3$ film as the surface layer.

When the separator 16 is formed from ferrite stainless steel mentioned above, the base material of the ferrite stainless steel may contain Al within a range of 0.5 wt % or more and 5 wt % or less. That is, in order to form an $Al_2O_3$ film as the surface layer of the separator 16, it is necessary that the content of Al in the base material of the ferrite stainless steel is 0.5 wt % or more. In addition, in order to favorably perform a welding process, it is necessary that the content of Al in the base material of the ferrite stainless steel is 5 wt % or less, more preferably 3 wt % or less. The base material of the ferrite stainless steel may further contain Si within a range of 0.1 wt % or more and less than 1 wt %.

The thickness of the separator 16 is desirably within a range of 0.05 mm or more and 0.5 mm or less. This is for maintaining the elastic function for mitigating the influence of the expansion and contraction of the single cell 10 in the temperature range of 500° C. to 700° C., which is the operating temperature of the fuel cell during power generation.

Configuration of Sealing Portion

The configuration of the sealing portion 17 will now be described in detail with reference to FIGS. 2 and 4. The sealing portion 17 is a member for hermetically bonding the separator 16 and the electrolyte 11 and is mainly constituted of a glass composition containing ceramics. The sealing portion 17 has a function of bonding the separator 16 and the electrolyte 11 and also a function of sealing between the both to separate air and the fuel gas. As shown in FIGS. 2 and 4, the sealing portion 17 is disposed between the frame-shaped separator 16 and the electrolyte 11 to hermetically bond the both at the region in the inner peripheral portion of the frame-shaped separator 16 and facing the electrolyte 11 and the region of the periphery of the electrolyte 11 and facing the separator 16.

The sealing portion 17 can be constituted of a glass composition mainly composed of $Al_2O_3$ and $SiO_2$ and can have a thickness of 10 µm to 2 mm. Here, the thickness of the sealing portion 17 is the distance between the separator 16 and the electrolyte 11, and the thickness direction of the sealing portion 17 is defined as the stacking direction of the single cell 10 (the Z-axis direction in FIG. 2).

An example of the combination of the sealing portion 17, the separator 16, and the electrolyte 11 in the above-described configuration is as follows. That is, the separator 16 is of Al-containing ferrite stainless steel having a surface layer of $Al_2O_3$, the sealing portion 17 is of a glass composition mainly containing $Al_2O_3$ and $SiO_2$, and the electrolyte 11 is of Yb-doped barium zirconate (BZYb).

Furthermore, the sealing portion 17 according to the embodiment is constituted of a glass composition substantially not containing Ba at least in a first region 18 that is a predetermined range from the interfaces respectively coming into contact with air and a fuel gas. Here, the term "substantially not containing Ba" means, for example, excluding cases where Ba moves by diffusion from the electrolyte 11 side or the second region 19 and inevitably contains Ba. The first region 18 is a region through which air and fuel gas molecules can penetrate from the interfaces respectively coming into contact with the air and the fuel gas toward the inside of the sealing portion 17, and is affected by carbon dioxide contained in the air and the fuel gas. More specifically, the first region 18 in the configuration of the sealing portion 17 shown in FIG. 4 can be composed of a region into which air can penetrate from the surface on the air distribution region 30 side (interface on the side coming into contact with air) and a region into which a fuel gas can penetrate from the surface on the fuel gas distribution region 31 side (interface on the side coming into contact with a fuel gas). For example, in the sealing portion 17 shown in FIG. 4, the first region 18 can be composed of a region ranging from several hundred micrometers to one millimeter in the width direction (y-axis direction) of the sealing portion 17 from the interface on the side coming into contact with air and a region ranging from several hundred micrometers to one millimeter in the width direction (y-axis direction) of the sealing portion 17 from the interface on the side coming into contact with the fuel gas.

Thus, the sealing portion 17 does not contain Ba at least in the first region 18 and is therefore prevented from generating $BaCO_3$ by reaction with carbon dioxide contained in air and the fuel gas when the operating temperature of the fuel cell is within a low temperature range of, for example, 600° C. or less. The second region 19, which is the region excluding the first region 18 in the sealing portion 17, may contain Ba. That is, when the second region 19 contains Ba, the sealing portion 17 includes a region of a glass composition containing BaO.

Thus, when the sealing portion 17 includes a region of a glass composition containing BaO, the BaO can decrease the softening point of the glass composition and can increase the expansion coefficient. Accordingly, the second region 19 enables to readily form a sealing portion 17 having a thermal expansion coefficient suitable for sealing the separator 16 and the electrolyte 11 at a low temperature, while the first region 18 enabling suppression of the reaction with $CO_2$ in the fuel gas or air.

The bondability of the sealing portion 17 to each of the separator 16 and the electrolyte 11 should be controlled such that the $Al_2O_3$ film is not destroyed by extraction of a large amount of Al from the separator 16 and that large amounts of Ba, etc. are not extracted from the electrolyte 11, in order to maintain the function of the $Al_2O_3$ film formed as the surface layer of the separator 16 and the performance of the electrolyte 11. It is important that the sealing portion 17 has bonding power such that the amount of Al extracted from the separator 16 is within a range that does not destroy the $Al_2O_3$ film and that the amount of Ba extracted from the electrolyte 11 is within a range that can maintain the performance of the electrolyte 11.

Modification 1

Figure 5:
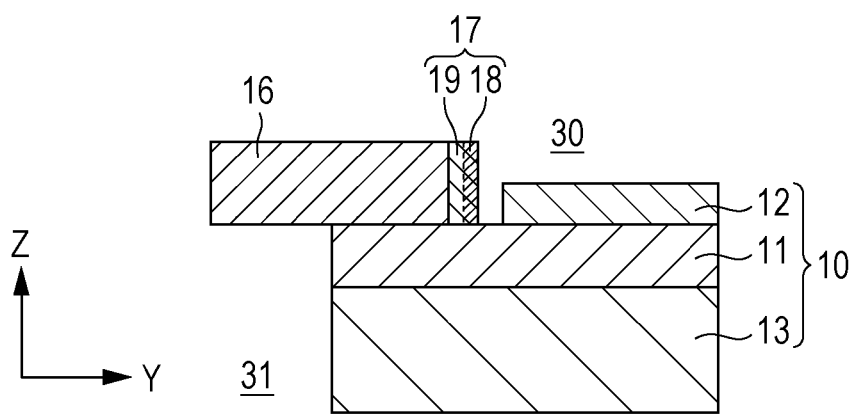
FIG. 5 is a diagram schematically illustrating an example of the configuration of the single cell, separator, and sealing portion according to Modification 1 of the embodiment of the present disclosure.

The sealing portion 17 according to the embodiment of the present disclosure has, as shown in FIG. 4, a predetermined thickness and connects the main surfaces of the separator 16 and the electrolyte 11 facing each other. However, the bonding position of the sealing portion 17 is not limited to this position. For example, as shown in FIG. 5, the sealing portion 17 may connect an end of the inner peripheral portion of the frame-shaped separator 16 and the main surface of the electrolyte 11 on the air electrode 12 side in a state that the separator 16 and the electrolyte 11 are in contact with each other. FIG. 5 is a diagram schematically illustrating an example of the configuration of the single cell 10, the separator 16, and the sealing portion 17 according to Modification 1 of the embodiment of the present disclosure.

In the sealing portion 17 according to Modification 1, the first region 18 is a region including the range into which air penetrates from the surface on the air distribution region 30 side (the interface on the side coming into contact with air). Specifically, the first region 18 is a region ranging from several hundred micrometers to one millimeter in the width direction (y-axis direction) of the sealing portion 17 from the interface on the side coming into contact with air. In the sealing portion 17 according to Modification 1, the range excluding the first region 18 is the second region 19, and the second region 19 may contain Ba.

Modification 2

Figure 6:
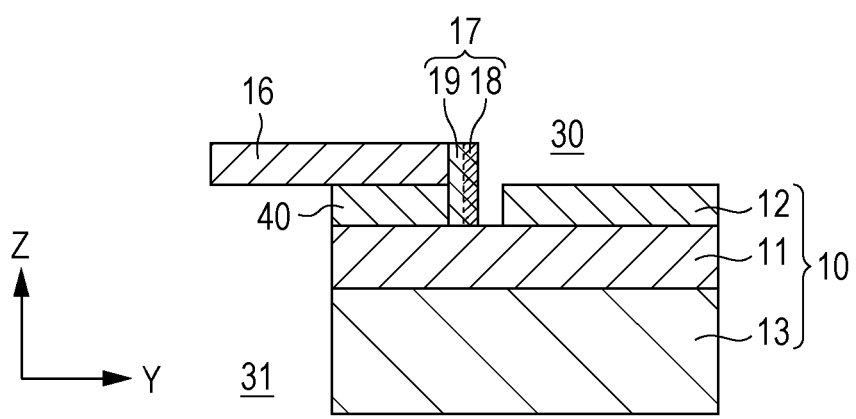
FIG. 6 is a diagram schematically illustrating an example of the configuration of the single cell, separator, and sealing portion according to Modification 2 of the embodiment of the present disclosure.

As shown in FIG. 6, an intermediate material 40 may fill between the separator 16 and the electrolyte 11 without connecting the separator 16 and the electrolyte 11 by direct contact as in Modification 1 shown in FIG. 5, and the separator 16 and the electrolyte 11 may be connected via the sealing portion 17. FIG. 6 is a diagram schematically illustrating an example of the configuration of the single cell 10, the separator 16, and the sealing portion 17 according to Modification 2 of the embodiment of the present disclosure.

As the intermediate material 40, Ag wax or Ni wax can be used. In Modification 2, since the intermediate material 40 is provided, even when the separator 16 and the electrolyte 11 cannot be connected by direct contact unlike Modification 1 shown in FIG. 5, the separator 16 and the electrolyte 11 can be connected to each other.

In the sealing portion 17 according to Modification 2, the first region 18 is a region including the range into which air penetrates from the surface on the air distribution region 30 side (the interface on the side coming into contact with air) as in Modification 1. Specifically, the first region 18 is a region ranging from several hundred micrometers to one millimeter in the width direction (y-axis direction) of the sealing portion 17 from the interface on the side coming into contact with air. In the sealing portion 17 according to Modification 2, the range excluding the first region 18 is the second region 19, and the second region 19 may contain Ba.

Modification 3

Figure 7:
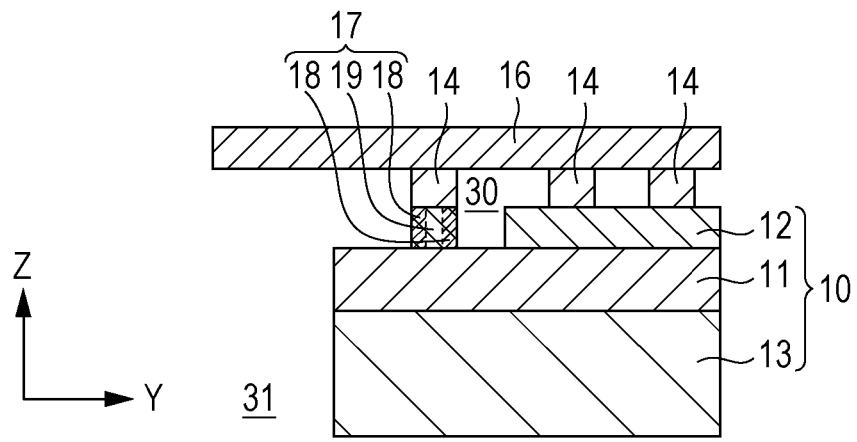
FIG. 7 is a diagram schematically illustrating an example of the configuration of the single cell, separator, and sealing portion according to Modification 3 of the embodiment of the present disclosure.

In the fuel cell stack 1 according to the embodiment of the present disclosure, the separator 16 and the interconnector 9 are separately provided, but the configuration is not limited thereto. For example, as shown in FIG. 7, the separator 16 may also function as an interconnector, and a part of the air electrode-side current collectors 14 provided to the separator 16 may be connected to the electrolyte 11 via the sealing portion 17. FIG. 7 is a diagram schematically illustrating an example of the configuration of the single cell 10, the separator 16, and the sealing portion 17 according to Modification 3 of the embodiment of the present disclosure.

In the sealing portion 17 according to Modification 3, the first region 18 can include a region including the range into which air penetrates from the surface on the air distribution region 30 side (the interface on the side coming into contact with air) and a region including the range into which the fuel gas penetrates from the surface on the fuel gas distribution region 31 side (the interface on the side coming into contact with the fuel gas). For example, in the sealing portion 17 according to Modification 3 shown in FIG. 7, the first region 18 can be a region ranging from several hundred micrometers to one millimeter in the width direction (y-axis direction) of the sealing portion 17 from the interface on the side coming into contact with air and a region ranging from several hundred micrometers to one millimeter in the width direction (y-axis direction) of the sealing portion 17 from the interface on the side coming into contact with the fuel gas. In the sealing portion 17 according to Modification 3, the range excluding the first region 18 is the second region 19, and the second region 19 may contain Ba.

Modification 4

Figure 8:
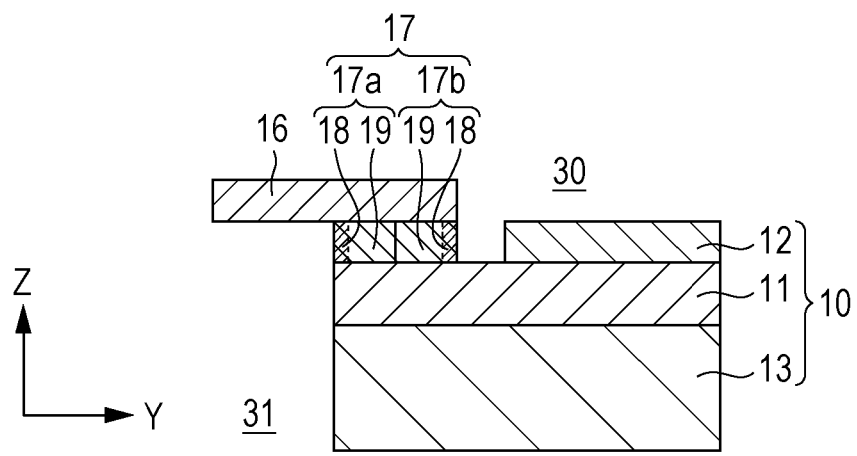
FIG. 8 is a diagram schematically illustrating an example of the configuration of the single cell, separator, and sealing portion according to Modification 4 of the embodiment of the present disclosure.

As shown in FIG. 8, in the configuration in which the sealing portion 17 is disposed between the separator 16 and the electrolyte 11 as in the fuel cell according to the embodiment shown in FIG. 4, the sealing portion 17 may be composed of a first sealing layer 17a and a second sealing layer 17b. FIG. 8 is a diagram schematically illustrating an example of the configuration of the single cell 10, the separator 16, and the sealing portion 17 according to Modification 4 of the embodiment of the present disclosure.

That is, the sealing portion 17 according to Modification 4 has a configuration formed by stacking a first sealing layer 17a having a surface coming into contact with the fuel gas flowing in the fuel gas distribution region 31 and a second sealing layer 17b having a surface coming into contact with the air flowing in the air distribution region 30. In other words, the sealing portion 17 according to Modification 4 has a configuration such that the sealing portion 17 according to the embodiment is divided into two layers in the Y-axis direction, where the second sealing layer 17b is closer to the air electrode 12 than the first sealing layer 17a is.

As shown in FIG. 8, in the first sealing layer 17a of the sealing portion 17 according to Modification 4, the upper surface is in contact with the separator 16, the lower surface is in contact with the electrolyte 11, and the side surface on the air electrode side (the side surface in the right of FIG. 8) is in contact with the second sealing layer 17b. Another side surface opposite to the surface contacting with the second sealing layer 17b, i.e., the side surface of the first sealing layer 17a on the left side in FIG. 8 is exposed to the fuel gas flowing in the fuel gas distribution region 31. Accordingly, in the first sealing layer 17a, the first region 18, which is a predetermined range from the interface coming into contact with the fuel gas, does not contain Ba.

As shown in FIG. 8, in the second sealing layer 17b of the sealing portion 17 according to Modification 4, the upper surface is in contact with the separator 16, the lower surface is in contact with the electrolyte 11, and the side surface on the air electrode side (the side surface in the right of FIG. 8) is in contact with the air flowing in the air distribution region 30. Another side surface opposite to the surface contacting with air, i.e., the side surface of the second sealing layer 17b on the left side in FIG. 8 is in contact with the first sealing layer 17a. Accordingly, in the second sealing layer 17b, the first region 18, which is a predetermined range from the interface coming into contact with air, does not contain Ba. In the sealing portion 17 according to Modification 4, the range excluding the first region 18 is the second region 19, and the second region 19 may contain Ba.

Modification 5

Figure 9:
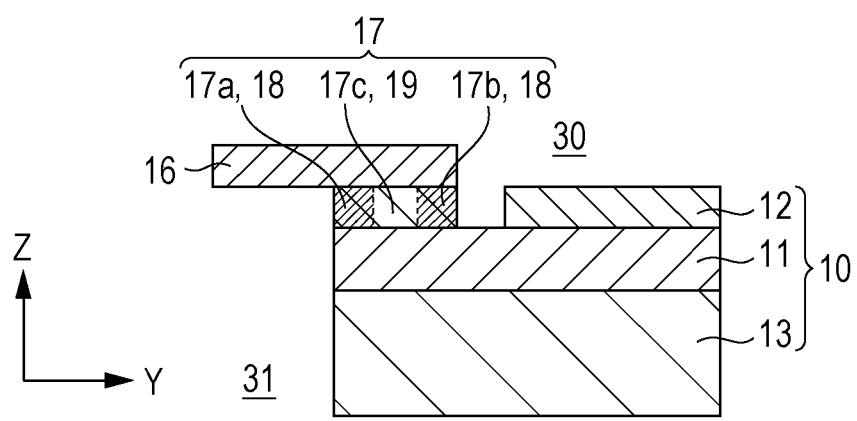
FIG. 9 is a diagram schematically illustrating an example of the configuration of the single cell, separator, and sealing portion according to Modification 5 of the embodiment of the present disclosure.

As shown in FIG. 9, in the configuration in which the sealing portion 17 is disposed between the separator 16 and the electrolyte 11 as in the fuel cell according to the embodiment shown in FIG. 4, the sealing portion 17 may be composed of a first sealing layer 17a, a second sealing layer 17b, and a third sealing layer 17c. FIG. 9 is a diagram schematically illustrating an example of the configuration of the single cell 10, the separator 16, and the sealing portion 17 according to Modification 5 of the embodiment of the present disclosure.

That is, the sealing portion 17 according to Modification 5 has a configuration formed by stacking a first sealing layer 17a having a surface coming into contact with the fuel gas flowing in the fuel gas distribution region 31, a second sealing layer 17b having a surface coming into contact with the air flowing in the air distribution region 30, and a third sealing layer 17c disposed between the first sealing layer 17a and the second sealing layer 17b. In other words, the sealing portion 17 according to Modification 5 has a configuration such that the sealing portion 17 according to the embodiment is divided into three layers in the Y-axis direction, where the second sealing layer 17b, the third sealing layer 17c, and the first sealing layer 17a are disposed from the air electrode 12 side in this order.

The first sealing layer 17a and the second sealing layer 17b are each the first region 18, and do not contain Ba. The third sealing layer 17c is the second region 19 and may contain Ba.

As described above, in the sealing portion 17 according to Modification 5, since the first region 18 that cannot contain Ba and the second region 19 that can contain Ba are formed as different layers, the sealing portion 17 can be easily produced.

In the fuel cell according to the embodiment of the present disclosure, a reformed gas prepared by reforming a hydrocarbon fuel gas by a reforming reaction may be supplied as a fuel gas to the fuel cell stack 1. In such a case, equipment necessary for the reforming reaction may be appropriately provided. For example, when the reforming reaction is a steam-reforming reaction, examples of the equipment necessary for the reforming reaction include a reformer, a vaporizer, and a water supply system for supplying water to the vaporizer.

The air to be supplied to the fuel cell stack 1 may be heated to about 300° C. to 700° C. by, for example, the heat generated in the fuel cell stack 1 during power generation or the heat of combustion of the air and fuel gas that have not been used for power generation.

The sealing portion provided to the fuel cell according to an aspect of the present disclosure can be widely used in fuel cells that need to maintain the hermetical bonding state between the separator, for separating a fuel gas and air, and the electrolyte for a long time. Furthermore, the sealing portion can be used for, for example, bonding a stacking member in a solid oxide fuel cell.

What is claimed is:

1. A fuel cell, comprising:
    a unit cell that includes:
        a fuel electrode, an air electrode, and electrolyte disposed between the fuel electrode and the air electrode;
        a separator for separating a fuel gas flowing through the fuel electrode and air flowing through the air electrode; and
        a sealing portion constituted of a glass composition for bonding the separator and the electrolyte, wherein
            the sealing portion includes a first region and a second region,
            the first region is exposed to the fuel gas and the air,
            the first region does not contain Ba, and the first region includes a surface of the sealing portion,
            the second region is sandwiched between two first regions,
            the first region of the two first regions that is exposed to the air is sandwiched between the separator and the electrolyte, and
            the second region is a remaining region of the sealing portion excluding the two first regions and the second region contains Ba.

2. The fuel cell according to claim 1, wherein the electrolyte includes a proton conductor.

3. The fuel cell according to claim 2, wherein the proton conductor is represented by a compositional formula: $BaZr_{1-x}M_xO_3$, where $0.05 \leq x \leq 0.5$; M is at least one selected from the group consisting of Sc, In, Lu, Yb, Tm, Er, Y, Ho, Dy, and Gd.

4. The fuel cell according to claim 3, wherein M is Yb.

* * * * *